July 29, 1930.  E. W. SEEGER  1,771,902
CONTROLLER FOR ELECTRIC MOTORS
Filed May 14, 1928
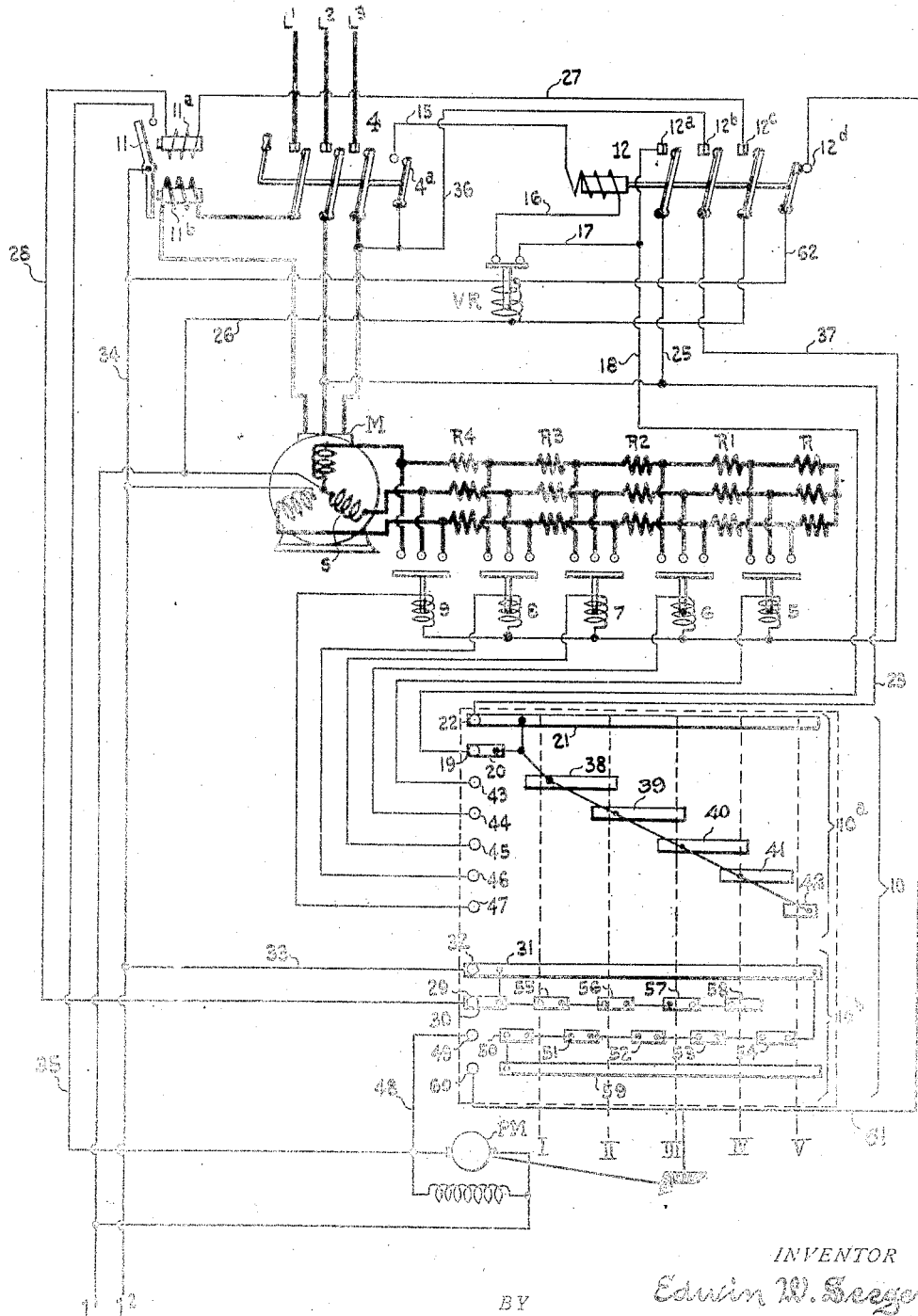
INVENTOR
Edwin W. Seeger
BY
ATTORNEY Patented July 29, 1930

1,771,902

UNITED STATES PATENT OFFICE

EDWIN W. SEEGER, OF WAUWATOSA, WISCONSIN, ASSIGNOR, BY MESNE ASSIGNMENTS, TO CUTLER-HAMMER, INC., OF MILWAUKEE, WISCONSIN, A CORPORATION OF DELAWARE

CONTROLLER FOR ELECTRIC MOTORS

Application filed May 14, 1928. Serial No. 277,605.

This invention relates to improvements in controllers for electric motors.

Controllers embodying the invention are especially advantageous for high torque synchronous motors starting as slip ring induction motors. However, it is to be understood that the invention is not limited to such controllers.

The invention has among its objects to provide simple and efficient control means for motors of the aforementioned and other types affording a relatively long accelerating period therefor.

A further object of the invention is to provide for current limit acceleration without resort to the elaborate current limit means heretofore required.

Other objects and advantages of the invention will hereinafter appear.

The accompanying drawing illustrates diagrammatially one embodiment of the invention which will now be described, it being understood that the controller illustrated is susceptible of various modifications and that certain features thereof may be used in various other relations without departing from the scope of the appended claims.

Referring to the drawing, there is shown a conventional type of high torque synchronous motor M having a primary to be supplied from an alternating current supply circuit $L^1$ $L^2$ $L^3$ and a secondary S comprising star connected windings. The secondary windings have a circuit including a plurality of steps of starting resistance R, $R^1$, $R^2$, $R^3$ and $R^4$, it being understood that the starting resistance may be divided into any desired number of steps. Also the secondary windings have connections with a direct current supply circuit $l^1$ $l^2$ whereby the same windings serve as a direct current field when the motor attains synchronous speed. As will be understood, the circuit $l^1$ $l^2$ may be supplied by an exciter if desired.

The control means illustrated includes a three pole switch 4 to connect the primary of the motor to lines $L^1$ $L^2$ and $L^3$, said switch being shown as of a manually operated type, and electroresponsive accelerating switches 5, 6, 7, 8 and 9 to exclude the steps of starting resistance R, $R^1$, $R^2$, $R^3$ and $R^4$, respectively, said switches to be energized successively by connection to a source of alternating current supply through a drum type master switch 10. As illustrated, the windings of the accelerating switches are arranged to be connected across lines $L^2$ and $L^3$, but it is to be understood that if desired a potential transformer might be provided to supply said windings and certain other windings hereinafter specified.

The drum type master switch 10 comprises two sections $10^a$ and $10^b$, the former for commutation of the aforementioned and other alternating current control circuits, and the latter for commutation of certain direct current control circuits hereinafter set forth. The drum sections while electrically independent may be assumed to be mechanically connected for operation in unison by a pilot motor PM to be connected across the direct current circuit $l^1$ $l^2$.

The pilot motor is normally disconnected from circuit and is under the control of a relay 11 of the so-called lockout type and a relay 12 which has a number of contacts and which controls certain alternating current circuits as well as direct current circuits. Also, the pilot motor is indirectly under the control of a voltage relay VR which controls the energizing circuit of relay 12 and which has its own operating winding connected across the direct current line $l^1$ $l^2$. The aforementioned relay 11 has an operating winding $11^a$ to be supplied with direct current through the relay 12 and a lockout winding $11^b$ which is shown as connected in series between line $L^1$ and the primary of motor M. However, it is to be understood that a current transformer might be provided for supplying the winding $11^b$ if preferred.

The arrangement is such that upon closure of main switch 4 the primary circuit of the motor is closed, and assuming the drum to be in off position and relay VR to be energized by the direct current supply as illustrated, the switch 12 is energized to complete the circuit of the operating winding $11^a$ of relay 11, but without immediate result, owing to the lockout action of winding $11^b$. However, as soon as the initial surge of current in the primary circuit of motor M decreases to a given value winding 11ᵃ functions to close the relay 11 to thereby complete the pilot motor circuit. This causes the pilot motor to operate the drum to complete the energizing circuit of accelerating switch 5, which upon responding excludes step R of the starting resistance. At the same time the pilot motor operates the drum to establish for the pilot motor a circuit shunting relay 11, then to interrupt and reestablish the circuit of the operating winding of relay 11, and finally to interrupt the pilot motor connections for arrest of said drum pending further response of relay 11. Thus accelerating action of the controller is arrested after exclusion of resistance R and pending further response of relay 11 subject to control by the current condition of the primary circuit of the motor. However, as soon as the surge of current in the primary circuit resulting from exclusion of resistance R is decreased to the aforementioned given value the relay is caused to again respond to effect a repetition of the aforedescribed cycle to energize accelerating switch 6. Thereafter the same cycle is repeated for energization of the remaining accelerating switches successively, whereas after closure of all of these switches the relay 11 remains open. The pilot motor is thus disabled pending disconnection of the motor M from the supply circuit $L^1$ $L^2$ $L^3$ whereupon relay 12 is deenergized to complete the pilot motor circuit for return of the drum to off position.

As has been pointed out, the aforedescribed accelerating operation is dependent upon energization of voltage relay VR and hence upon normal voltage of the direct current supply for the secondary. Also, initiation of accelerating operation is dependent upon the drum being in off position. Off positioning of the drum is essential to establishment of the energizing circuit of relay 12, but said relay upon responding establishes for itself a maintaining circuit independent of the drum. The relay 12 is adapted to be deenergized by auxiliary contacts 4ᵃ of switch 4 when said switch is opened to disconnect the motor M.

As will be apparent, the control described provides for a time delay incident to closure of each accelerating switch as a result of the current limit characteristic of relay 11. Also as will appear, the pilot motor operated drum affords a further time element incident to the closure of each accelerating switch and affords at least a given minimum delay even if the relay 11 responds immediately upon energization of its winding 11ᵃ.

More specifically describing the control circuits closure of the primary switch 4 completes circuit from line $L^3$ through its auxiliary contacts 4ᵃ by conductor 15 through the winding of relay 12 by conductor 16 through relay VR by conductors 17 and 18 to and through drum contact 19, segment 20, segment 21 and contact 22, by conductor 23 to line $L^2$. This provides for energization of relay 12 which upon responding completes a maintaining circuit for its winding extending from conductor 17 through contacts 12ᵃ of said relay by conductor 25 to conductor 23 and thence to line $L^2$.

Also, relay 12 in responding completes circuit from direct current supply line $l^1$ by conductor 26 through contacts 12ᶜ of said relay by conductor 27 through the winding 11ᵃ of relay 11 by conductor 28 to drum contact 29, segment 30, segment 31, contact 32, by conductor 33 to direct current supply line $l^2$. This provides for energization of relay 11 subject to current control and said relay upon responding completes circuit from direct current supply line $l^2$ by conductor 34 through said relay by conductor 35 through the pilot motor to direct current supply line $l^1$.

Further relay 12 upon responding completes a circuit from line $L^3$ by conductor 36 through contacts 12ᵇ of said relay, by conductor 37 to one terminal of each accelerating switch windings whereby said windings may be energized sequentially by engagement of drum segments 38, 39, 40, 41 and 42 with contacts 43, 44, 45, 46 and 47, respectively. As will be apparent, the contacts 43, 44, 45, 46 and 47 are connected to the windings of accelerating switches 5, 6, 7, 8 and 9 respectively, whereas the segments 38 to 42 are connected to segment 21 and thus afford a connection to line $L^2$ by conductor 23. In connection with this portion of the drum it is to be noted that segment 20 is relatively short and arranged to disengage contact 19 prior to engagement of segment 38 with contact 43 whereby the relay 12 is rendered dependent upon its maintaining circuit prior to initiation of acceleration.

The section 10ᵇ of the drum when operated completes a circuit from direct current line $l^1$ through the pilot motor by conductor 48 to drum contact 49, segments 50, 51, 52, 53 and 54 in series, segment 31, contact 32 by conductor 33 to direct current line $l^2$, thereby maintaining the pilot motor in operation independently of realy 11. Also, the drum provides for interruption of the circuit of winding 11ᵃ of relay 11 by disengagement of drum segment 30 from contact 29 immediately after engagement of drum segment 50 with contact 49 to establish the aforedescribed pilot motor circuit. On the other hand, the drum upon partial rotation disengages segment 50 from contact 49 to interrupt the pilot motor circuit. However, in the meantime the drum engages segment 55 with contact 29 to reestablish the circuit of the winding 11ᵃ of relay 11 for further operation of the pilot motor as heretofore explained, and as will be apparent repetitions of the aforedescribed commutations are provided for by the following groups of segments 55—51—56, 56—52—57, 57—53—58 whereas segments 58—54 provide for certain of said commutations and prolonged arrest of the drum.

The drum in its final accelerating position completes a circuit from direct current line $l^2$ through the pilot motor by conductors 35 and 48 to drum contact 49, segment 54, segment 59, contact 60 by conductor 61 to the contacts $12^d$ of relay 12 and the latter contacts when engaged by deenergization of relay 12 provide for continuing the pilot motor circuit by conductors 62 and 34 to direct current line $l^1$. Thus the drum and contacts $12^d$ of relay 12 provide a pilot motor circuit for return of said drum to off position when relay 12 opens.

As will now be apparent the drum may be so designed and geared to the pilot motor as to provide for lapse of more or less time between responses of successive accelerating switches. Thus each accelerating switch is subjected to a delay controlled by relay 11 and a further delay controlled by the drum whereby relatively long lapses are obtainable through the medium of extremely simple means.

What I claim as new and desire to secure by Letters Patent is:

1. In a motor controller, the combination with an electric pilot motor, of a device operable thereby to effect certain commutations of the controlled motor circuit sequentially, said pilot motor having alternative energizing circuits for effecting operation thereof in a given direction, said device having associated means to effect interruption of one of said energizing circuits upon effecting each such commutation, and means also associated with said device for thereupon presetting the other of said energizing circuits for completion automatically in response to a given electrical condition of the controlled motor circuit, said means including a relay having a single operating winding the energizing circuit of which is subject to direct control by said device.

2. The combination with a motor, of means including a pilot motor operated device, to effect certain commutations of the circuit of the controlled motor sequentially, said device being self arresting in given positions thereof, and a starting switch for said pilot motor operated device having an operating winding under the control of said device for response intermittently, and a restraining winding subjected to influence by an electrical condition of the circuit of the controlled motor.

3. The combination with a motor, of means including a pilot motor operated device, to effect certain commutations of the circuit of the controlled motor under the direction of said device, said device being self arresting upon effecting each such commutation, and an electroresponsive starting switch for said pilot motor operated device having an operating winding controlled by said device and a restraining winding subjected to influence by an electrical condition of the circuit of the controlled motor, said device acting upon starting to establish for itself running connections independent of said switch and then to deenergize said switch.

4. In a motor controller, the combination with means including a pilot motor operated device, to effect progressively certain commutations of the circuit of the controlled motor, of a starting switch for said device having a restraining winding to be subjected to influence by an electrical condition of the circuit of the controlled motor, and an operating winding having a circuit to be completed by said device in different predetermined positions, said device acting upon movement between such positions to establish for itself running connections independent of said switch and then to deenergize said switch and said device upon reaching each of the aforementioned positions acting to interrupt its said running connections.

5. In a motor controller, the combination with accelerating means including a pilot motor operated device through which the rate of accelerating action of said means is governed, of a starting switch for said device having a restraining winding influenced by an electrical condition of the circuit of the motor to be accelerated and having an operating winding, running connections for said device independent of said switch, said device controlling said switch operating winding and said running connections for automatic operation of said device through a given range for arrest of said device in different positions for temporary periods governed by said switch and for arrest of said device in a final position, and means to effect return of said device to initial position.

6. The combination with a synchronous motor, of alternating and direct current supply circuits therefor and accelerating means for said motor including a pilot motor operated device, and a switch to connect the pilot motor of said device to one of said supply circuits, said switch having a restraining winding subjected to influence by the value of current in an alternating current branch of the motor circuit and having an operating winding to be supplied from said direct current circuit under the control of said device.

7. The combination with a synchronous motor, of alternating and direct current supply circuits therefor and accelerating means for said motor including a pilot motor operated device and a switch to connect the pilot motor of said device to one of said supply circuits, said switch having a restraining winding subjected to influence by the value of current in an alternating current branch of the motor circuit and having an operating winding to be supplied from said direct current circuit under the control of said device for energization and deenergization intermittently as said device is advanced, said device having independent running connections controlled thereby to continue its movement after starting thereof by said switch and to render said device self arresting in a number of different positions.

In witness whereof, I have hereunto subscribed my name.

EDWIN W. SEEGER.